United States Patent
Bae et al.

(10) Patent No.: US 9,363,552 B2
(45) Date of Patent: Jun. 7, 2016

(54) DISPLAY APPARATUS, CONTROL METHOD OF DISPLAY APPARATUS, AND COMPUTER READABLE RECORDING MEDIUM

(71) Applicant: SAMSUNG ELECTRONICS CO., LTD., Suwon-si (KR)

(72) Inventors: Hee-jeong Bae, Osan-si (KR); Yong-hwan Kwon, Seongnam-si (KR); Jang-won Seo, Seoul (KR); Myung-kwan Choi, Suwon-si (KR); Yoo-jin Choi, Seoul (KR); Woo-seok Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 69 days.

(21) Appl. No.: 14/143,721

(22) Filed: Dec. 30, 2013

(65) Prior Publication Data

US 2014/0354762 A1    Dec. 4, 2014

(30) Foreign Application Priority Data

May 29, 2013 (KR) ........................ 10-2013-0061190

(51) Int. Cl.
*H04N 21/431* (2011.01)
*H04N 7/14* (2006.01)
*H04N 21/478* (2011.01)
*H04N 21/4788* (2011.01)

(52) U.S. Cl.
CPC ........... *H04N 21/4316* (2013.01); *H04N 7/141* (2013.01); *H04N 21/478* (2013.01); *H04N 21/4788* (2013.01)

(58) Field of Classification Search
CPC .......................... H04N 21/4316; H04N 7/141
USPC ............ 348/14.07; 455/403, 411, 466, 414.1, 455/418, 552.1; 704/201; 709/204, 206, 709/218; 715/719, 752, 810, 811, 838, 772, 715/708, 716, 758, 776; 725/37, 47; 726/7; 370/254, 252; 706/47; 434/365

See application file for complete search history.

(56) References Cited

U.S. PATENT DOCUMENTS

| | | | | |
|---|---|---|---|---|
| 5,042,027 A | * | 8/1991 | Takase | H04L 45/00 340/2.7 |
| 6,430,405 B1 | * | 8/2002 | Jambhekar et al. | 455/403 |
| 7,801,054 B2 | * | 9/2010 | Reichman | H04L 41/5009 370/252 |
| 7,818,379 B1 | * | 10/2010 | Heikes | H04L 12/1822 709/206 |
| 8,055,602 B2 | * | 11/2011 | Tirpak | G06F 9/4443 706/47 |
| 8,472,926 B2 | * | 6/2013 | Doudkine | G06Q 10/107 379/88.13 |
| 8,532,699 B2 | * | 9/2013 | Athalye | H04W 36/24 455/425 |
| 8,819,588 B2 | * | 8/2014 | Seong et al. | 715/811 |

(Continued)

FOREIGN PATENT DOCUMENTS

KR    1020090003971 A    1/2009

*Primary Examiner* — Gerald Gauthier

(74) *Attorney, Agent, or Firm* — Sughrue Mion, PLLC

(57) ABSTRACT

A control method of a display apparatus is provided. The control method includes: detecting performance information of a communication service by the display apparatus; generating a plurality of home screens comprising an integrated communication service home screen, using the detected performance information the of the communication service; and when a predetermined user manipulation is received, displaying a display screen which displays the integrated communication service home screen and some regions of a home screen other than the integrated communication service home screen altogether.

20 Claims, 11 Drawing Sheets

(56) References Cited

U.S. PATENT DOCUMENTS

| | | | | |
|---|---|---|---|---|
| 8,903,949 | B2* | 12/2014 | Sridhar | H04L 41/5003 709/218 |
| 2006/0236338 | A1* | 10/2006 | Shimoda | G06F 17/30817 725/37 |
| 2007/0058569 | A1* | 3/2007 | McMenamin | H04L 29/06027 370/254 |
| 2008/0141133 | A1* | 6/2008 | Yamamoto | G06F 17/30743 715/716 |
| 2009/0117923 | A1* | 5/2009 | Berger et al. | 455/466 |
| 2010/0186055 | A1 | 7/2010 | Gupta | |
| 2010/0328092 | A1* | 12/2010 | Kondo | G06Q 50/12 345/204 |
| 2012/0005617 | A1* | 1/2012 | Lee | G06F 17/30038 715/776 |
| 2012/0015342 | A1* | 1/2012 | Baldwin | G06F 17/279 434/365 |
| 2013/0097546 | A1* | 4/2013 | Gardenfors | H04L 12/586 715/772 |
| 2013/0159933 | A1* | 6/2013 | Bae et al. | 715/838 |
| 2013/0179785 | A1* | 7/2013 | Kim et al. | 715/719 |
| 2013/0254291 | A1* | 9/2013 | Park et al. | 709/204 |
| 2013/0304457 | A1* | 11/2013 | Kang et al. | 704/201 |
| 2013/0346886 | A1* | 12/2013 | Cauchois | H04L 51/046 715/758 |
| 2014/0026201 | A1* | 1/2014 | Srinivasan et al. | 726/7 |
| 2014/0129979 | A1* | 5/2014 | Bae et al. | 715/810 |
| 2014/0136991 | A1* | 5/2014 | Bae et al. | 715/752 |
| 2014/0188997 | A1* | 7/2014 | Schneiderman | H04L 51/32 709/204 |
| 2014/0206328 | A1* | 7/2014 | Varoglu | H04W 4/028 455/418 |
| 2014/0354762 | A1* | 12/2014 | Bae | H04N 21/4316 348/14.07 |
| 2014/0359664 | A1* | 12/2014 | Bae et al. | 725/37 |
| 2015/0058893 | A1* | 2/2015 | Hong et al. | 725/47 |

* cited by examiner

100

DISPLAY APPARATUS, CONTROL METHOD OF DISPLAY APPARATUS, AND COMPUTER READABLE RECORDING MEDIUM

CROSS-REFERENCE TO RELATED APPLICATION

This application claims priority from Korean Patent Application No. 10-2013-0061190, filed on May 29, 2013 in the Korean Intellectual Property Office, the disclosure of which is incorporated herein by reference in its entirety.

BACKGROUND

1. Field

Apparatuses and methods consistent with exemplary embodiments relate to a display apparatus, a control method of a display apparatus, and a computer readable recording medium, and more particularly, to a display apparatus which displays a home screen for the sake of users' convenience, a control method of a display apparatus, and a computer readable recording medium.

2. Description of the Related Art

With the development of display apparatus technologies and communication technologies, modern display apparatuses (for example, a smart television (TV)) can provide a variety of services.

However, display apparatuses of the related art fail to adequately expose users to a variety of services. Therefore, users of the display apparatuses do not recognize a variety of services and simply access broadcasting services which are normal services that the display apparatuses provide.

Furthermore, even if users of the display apparatuses recognize the variety of services, the users are required to use separate buttons or perform a complicated process in order to access such various services.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus which displays an integrated communication service home screen and some regions of a home screen other than the integrated communication service home screen altogether, a control method of a display apparatus, and a computer readable recording medium.

According to an aspect of an exemplary embodiment, there is provided a control method of a display apparatus, the control method including: detecting performance information of a communication service performed by the display apparatus; generating a plurality of home screens including an integrated communication service home screen, using the detected performance information; and in response to a predetermined user manipulation being received, displaying a display screen which displays the integrated communication service home screen and a region of a home screen other than the integrated communication service home screen.

The communication service may include at least one of a call service, a messaging service, and a social network service.

The integrated communication service home screen may include a first region to display a list of persons that have been recently contacted though the communication service, and a second region to display a list of persons that are frequently contacted though the communication service.

The integrated communication service home screen may further include a third region to display an integrated list of friends, a fourth region to display an integrated list of messages, and a fifth region to display an integrated list of calls.

The control method may further include: making a video call to at least one counterpart apparatus in response to a user manipulation on the integrated communication service home screen; and, in response to the video call being made, displaying a video call screen including a screen displaying a user of the display apparatus and a screen displaying a user of the at least one counterpart apparatus. The video call screen may include a sixth region to display a list of image processing operations for the screen displaying the user of the display apparatus.

The list of image processing operations for the screen displaying the user of the display apparatus may include at least one of operations of processing a background screen of the screen displaying the user of the display apparatus, adding a character effect to the screen displaying the user of the display apparatus, and zooming in/out the screen displaying the user of the display apparatus.

The displaying may include displaying a display screen on which the integrated communication service home screen is positioned at a center of the display screen, and regions of home screens other than the integrated communication service home screen are positioned at a left side and a right side of the display screen.

The control method may further include, in response to a predetermined time elapsing after the display screen has been displayed, displaying a display screen displaying only the integrated communication service home screen.

The control method may further include: receiving a user manipulation to select the home screen other than the integrated communication service home screen; and displaying a display screen which is generated based on the selected home screen.

According to an aspect of another exemplary embodiment, there is provided a display apparatus including: a display configured to display a screen; an inputter configured to receive a user manipulation on the display apparatus; and a controller configured to detect performance information of a communication service performed by the display apparatus, and to generate a plurality of home screens including an integrated communication service home screen, using the detected performance information. In response to a predetermined user manipulation being received through the inputter, the controller may be further configured to control the display to display a display screen which displays the integrated communication service home screen and a region of a home screen other than the integrated communication service home screen.

The communication service may include at least one of a call service, a messaging service, and a social network service.

The integrated communication service home screen may include a first region to display a list of persons that have been recently contacted though the communication service, and a second region to display a list of persons that are frequently contacted though the communication service.

The integrated communication service home screen may further include a third region to display an integrated list of friends, a fourth region to display an integrated list of messages, and a fifth region to display an integrated list of calls.

The controller may be further configured to make a video call to at least one counterpart apparatus in response to a user manipulation on the integrated communication service home screen, and, in response to the video call being made, the display may be further configured to display a video call screen including a screen displaying a user of the display apparatus and a screen displaying a user of the at least one counterpart apparatus. The video call screen may include a sixth region to display a list of image processing operations for the screen displaying the user of the display apparatus.

The list of image processing operations of the screen on the user of the display apparatus may include at least one of operations of processing a background screen of the screen on the user of the display apparatus, adding a character effect to the screen on the user of the display apparatus, and zooming in/out the screen on the user of the display apparatus.

The controller may be further configured to control the display to display a display screen on which the integrated communication service home screen is positioned at a center of the display screen, and regions of home screens other than the integrated communication service home screen are positioned at a left side and a right side of the display screen.

In response to a predetermined time elapsing after the display screen has been displayed, the controller may be further configured to control the display to display a display screen displaying only the integrated communication service home screen.

The inputter may be further configured to receive a user manipulation to select the home screen other than the integrated communication service home screen, and the controller may be further configured to control the display to display a display screen which is generated based on the selected home screen.

According to an aspect of another exemplary embodiment, there is provided a non-transitory computer-readable recording medium having recoded thereon a program which, when executed by a computer, performs a control method of a display apparatus, the control method including: detecting performance information of a communication service performed by the display apparatus; generating a plurality of home screens including an integrated communication service home screen, using the detected performance information; and in response to a predetermined user manipulation being received, displaying a display screen which displays the integrated communication service home screen and a region of a home screen other than the integrated communication service home screen altogether.

According to an aspect of another exemplary embodiment, there is provided a display apparatus including: an inputter configured to receive an input by a user; and a controller configured to generate a plurality of home screens to be displayed on a display, wherein each of the plurality of home screens correspond to a service performed by the display apparatus, and wherein, in response to receiving the input by the user, the controller is further configured to control the display to display a display screen on which a first home screen of the plurality of home screens is positioned at a center of the display screen, a second home screen of the plurality of home screens is positioned to the left of the first home screen, and a third home screen of the plurality of home screens is positioned to the right of the first home screen.

The first home screen may include an integrated communication service home screen.

The controller may be further configured to detect performance information of the service performed by the display apparatus, and to generate the plurality of home screens based on the detected performance information.

The service performed by the display apparatus may include a communication service including at least one of a call service, a messaging service, and a social network service.

The controller may be further configured to perform the communication service in response to receiving a second user input.

The controller may be further configured to control the display to display one of the second home screen and the third home screen at the center of the display in response to a receiving a third user input.

The display apparatus may further include the display.

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Figure 1:
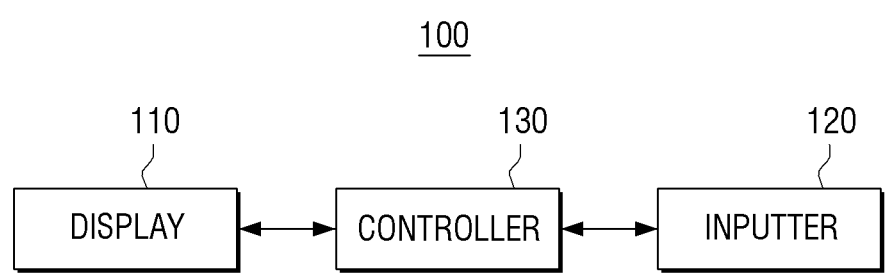
FIG. 1 is a block diagram illustrating a display apparatus according to an exemplary embodiment.

Hereinafter, certain exemplary embodiments will be described in greater detail with reference to the accompanying drawings.

In the following description, same reference numerals are used for the same elements, even in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 2:
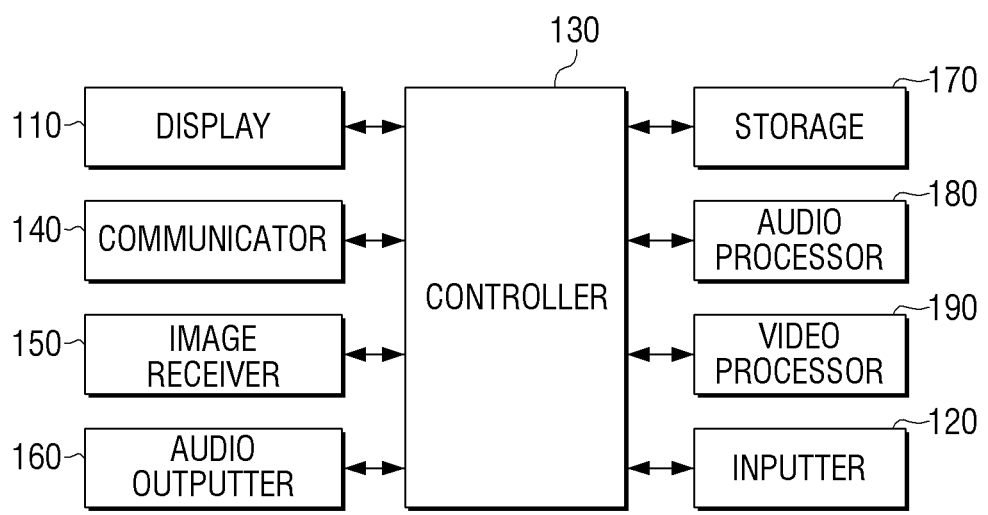
FIG. 2 is a block diagram illustrating the display apparatus of FIG. 1 in further detail.

FIG. 1 is a block diagram illustrating a display apparatus 100 according to an exemplary embodiment. FIG. 2 is a block diagram illustrating the display apparatus 100 of FIG. 1 in further detail. Referring to FIGS. 1 and 2, the display apparatus 100 includes all or some of a display 110, an inputter 120, a controller 130, a communicator 140, an image receiver 150, an audio outputter 160, a storage 170, an audio processor 180, and a video processor 190. The display apparatus 100 may be implemented by using a smart TV. However, this is merely an example and the display apparatus 100 may be implemented by using various display apparatuses such as a desktop personal computer (PC), a laptop PC, a projector, a tablet PC, a mobile phone, a personal digital assistant (PDA), a portable multimedia player (PMP), etc.

The display 110 displays a screen. Specifically, the display 110 may display a display screen which is generated under the control of the controller 130, which will be described later.

The display 110 may be implemented by using at least one of a liquid crystal display (LCD), a thin film transistor-liquid crystal display, an organic light emitting diode (OLED), a flexible display, a three-dimensional (3D) display, and a transparent display.

The inputter 120 receives a user manipulation on the display 110.

The inputter 120 may be implemented by using at least one of various button forms, a touch sensor which receives a touch input from a user to the display 110, a proximity sensor which receives a motion of a user approaching the display 110 without directly contacting a surface of the display 110, and a microphone which receives a user's voice input. The inputter 120 may also be implemented by combining an input apparatus such as a mouse, a keyboard, and a remote controller and a display apparatus such as the display 110. Accordingly, the inputter 120 may receive a variety of user inputs such as touch inputs, motion inputs, and voice inputs.

The communicator 140 allows the display apparatus 100 to communicate with various external apparatuses. The communicator 140 may include various communication chips such as a Wi-Fi chip, a Bluetooth® chip, a near field communication (NFC) chip, and a wireless communication chip. The Wi-Fi chip, the Bluetooth® chip, and the NFC chip communicate with external apparatuses with a Wi-Fi method, a Bluetooth® method, and an NFC method, respectively. The NFC chip communicates in the NFC method, which uses 13.56 MHz from among various RF-ID frequency bands such as 135 kHz, 13.56 MHz, 433 MHz, 860~960 MHz, and 2.45 GHz. When the Wi-Fi chip or the Bluetooth® chip is used, a variety of connection information such as a service set identifier (SSID) and a session key is exchanged first and connection is established using the connection information, and then, communication is performed. The wireless communication chip communicates with external apparatuses according various communication standards such as IEEE, Zigbee, $3^{rd}$ generation (3G), $3^{rd}$ generation partnership project (3GPP), and long term evolution (LTE).

The image receiver 150 receives image data through various sources. For example, the image receiver 150 may receive broadcast data corresponding to a broadcasting service from an external broadcasting station, and may receive image data corresponding to an image playback service from an external apparatus (e.g., a DVD apparatus).

The audio outputter 160 outputs a notice sound or a voice message in addition to various audio data processed by the audio processor 180.

The storage 170 stores various program modules for driving the display apparatus 100. For example, the storage 170 may store software including a base module, a sensing module, a communication module, a presentation module, a web browser module, and a service module. The base module refers to a module which processes signals transmitted from each hardware element included in the display apparatus 100 and transmits the signals to an upper layer module. The sensing module is a module which collects information from various sensors, and analyzes and manages the collected information, and may include a face recognition module, a voice recognition module, a motion recognition module, and an NFC recognition module. The presentation module is a module which generates a display screen. The communication module is a module for communicating with an external apparatus. The web browser module is a module which performs web-browsing and accesses a web server. The service module is a module which includes various applications to provide various services.

As described above, the storage 170 may include various program modules. However, some of the program modules may be omitted, changed, or added according to a type and a characteristic of the display apparatus 100.

The audio processor 180 processes audio data. Specifically, the audio processor 180 may perform various processing operations such as decoding, amplification, and noise filtering with respect to the audio data. The audio processor 180 may provide the processed audio data to the audio outputter 160.

The video processor 190 processes image data which is received from the image receiver 150. Specifically, the video processor 190 may perform various image processing operations such as decoding, scaling, noise filtering, frame rate conversion, and resolution conversion with respect to the image data.

The controller 130 controls an overall operation of the display apparatus 100. For example, the controller 130 may control all or some of the display 110, the inputter 120, the communicator 140, the image receiver 150, the audio outputter 160, the storage 170, the audio processor 180, and the video processor 190.

When the display apparatus 100 is turned on, the controller 130 may generate a plurality of home screens that the display apparatus 100 can provide. The home screen may be at least one of a screen displaying an image corresponding to a service, a screen displaying a plurality of icons, and a screen displaying a plurality of widgets.

For example, the home screen may be a home screen for a broadcasting service, a home screen for a service of playing back an image received from an external apparatus, a home screen for an application providing a service, a home screen for an integrated communication service, a home screen for a video on demand (VOD) service, or a home screen for a content providing service.

In the case of the home screen for the broadcasting service, the controller 130 may generate a home screen of a specific layout for a broadcasting service using broadcast data which is received through the image receiver 150 and the presentation module of the home screen for the broadcasting service that is stored in the storage 170.

In the case of the home screen for the application providing service, the controller 130 may generate a home screen of a specific layout for an application providing service using information regarding an application stored in the storage 170, and the presentation module of the home screen for the application providing service.

In the case of the home screen for the integrated communication service, the controller 130 may generate a home screen of a specific layout for an integrated communication service using performance information performance of a communication service stored in the storage 170, and the presentation module of the home screen for the integrated communication service.

Hereinafter, a method for generating a home screen for an integrated communication service will be explained in detail.

The controller 130 may detect performance information of a communication service of the display apparatus 100 that is stored in the storage 170. The communication service performed by the display apparatus 100 may include at least one of a call service (e.g., a video call or a voice call) performed through the display apparatus 100, a messaging service performed through the display apparatus 100, and a social network service performed through the display apparatus 100. That is, the controller 130 may detect various metadata such as metadata on profiles of counterpart persons for each service (e.g., a name, photo, phone number, email address, etc.), metadata on a contact time, metadata on a contact method (e.g., a call service: Skype® service, Tango® service; a messaging service: text messaging service, Kakao Talk® service; and a social network service: Facebook®, Twitter®, etc.), metadata on a number of times that contact is made, metadata on a contact record (e.g., contact time, contents, etc.), and metadata on a contact state (e.g., receive/send, create/reply, etc.).

The controller 130 may generate a home screen for an integrated communication service using the performance information of the communication service by the display apparatus 100, and the presentation module of the home screen for the integrated communication service that is stored in the storage 170.

Accordingly, the integrated communication service home screen as generated above may include a first region to display a list of persons that have been recently contacted through the communication service, and a second region to display a list of persons that are frequently contacted through the communication service. The list of persons may include various metadata information as described above, such as a profile, a contact method, a number of times that contact is made, a contact time, etc.

The integrated communication service home screen may further include a third region to display an integrated list of friends, a fourth region to display an integrated list of messages, and a fifth region to display an integrated list of calls. The third region, fourth region, and fifth region may be provided in the form of a menu. The integrated list of friends may be a list of friends that integrates a list of friends registered at various call services, a list of friends registered at various messaging services, and a list of friends registered at various social network services. The integrated list of messages may be a list of messages that integrates message sending/receiving history using various messaging services. The integrated list of calls may be a list of calls that integrates call receiving/sending history using various call services. When the third region is selected, the integrated list of friends, which is a sub-depth screen of the integrated communication service home screen, may be displayed. When the fourth region is selected, the integrated list of messages, which is a sub-depth screen of the integrated communication service home screen, may be displayed. When the fifth region is selected, the integrated list of calls, which is a sub-depth screen of the integrated communication service home screen, may be displayed.

When a user manipulation to perform a video call service is received through the integrated communication service home screen, the controller 130 may make a video call to at least one counterpart apparatus. That is, the controller 130 controls the communicator 140 to transmit an image which is photographed by the display apparatus 100 and/or a voice which is collected to the at least one counterpart apparatus, and controls the communicator 140 to receive an image which is photographed by the at least one counterpart apparatus and/or a voice which is collected from the at least one counterpart apparatus, thereby performing video calling.

When the video call is made, the controller 130 may control the display 110 to display a video call screen including a screen displaying a user of the display apparatus 100 and a screen displaying a user of the at least one counterpart apparatus. The video call screen may include a sixth region to display a list of image processing operations for the screen displaying the user of the display apparatus 100.

The list of image processing operations for the screen displaying the user of the display apparatus 100 may include at least one of operations of: processing a background screen of the screen displaying the user of the display apparatus 100, adding a character effect to the screen displaying the user of the display apparatus 100, and zooming in/out the screen displaying the user of the display apparatus 100.

For example, when the operation of processing the background screen of the screen of the user of the display apparatus 100 is selected, the controller 130 may change a background screen of the photographed image to another image, may apply a specific effect to the background screen of the photographed image, and may control the communicator 140 to transmit the generated image to the at least one counterpart apparatus.

The controller 130 may generate a plurality of display screens which display a first home screen and some regions of at least one home screen other than the first home screen (e.g., a second home screen from among a plurality of home screens).

For example, the controller 130 may generate the plurality of display screens by placing the first home screen of the plurality of home screens at the center of the display screen, and placing some regions of home screens other than the first home screen at the left and the right of the display screen.

When the display apparatus 100 is turned on, the controller 130 may control the display 110 to display a display screen including a default home screen from among the plurality of display screens.

The default home screen may be a home screen corresponding to a service that is performed shortly before the display apparatus 100 is turned off. The default home screen may be at least one of a home screen for a broadcasting service, and a home screen for a playback service for an image received from an external apparatus.

When a predetermined first user manipulation is input or when a predetermined time elapses after the display apparatus 100 is turned on, the controller 130 may control the display 110 to display a display screen displaying the home screen at the center of the display as a full screen. The predetermined first user manipulation may be a user manipulation of touching the home screen positioned at the center of the display screen or selecting a 'full screen display button' of the remote controller. Accordingly, the home screen positioned at the center of the currently displayed display screen may be displayed as a full screen.

Alternatively, the controller 130 may control the display 110 to display the display screen displaying the default home screen as a full screen when a predetermined time elapses after the display apparatus 100 has been turned on. Accordingly, the default home screen may be displayed as the full screen regardless of the home screen which is positioned at the center of the current display screen.

When a predetermined second user manipulation is input through the inputter 120, the controller 130 may control the display 110 to change a display screen displaying the first home screen as the full screen to a display screen displaying the first home screen and some regions of at least one home screen other than the first home screen, and display the changed display screen. The second user manipulation recited herein may be a user manipulation of selecting a 'multiple-home screen display button' of the remote controller.

When a predetermined third user manipulation is input through the inputter 120, the controller 130 may control the display 110 to change a display screen displaying the first home screen as the full screen to a display screen displaying the second home screen and some regions of at least one home screen other than the second home screen, and display the changed display screen. The third user manipulation recited herein may be a user manipulation of selecting a 'direction button' of the remote controller. That is, in a state in which the first home screen is displayed as the full screen, when a 'left button' is selected, the controller 130 may control the display 110 to change a display screen to a display screen displaying the second home screen positioned at the left of the first home screen and at least one home screen other than the second home screen, and display the changed display screen.

When a predetermined fourth user manipulation is input through the inputter 120, the controller 130 may control the display 110 to change a display screen displaying the first home screen and some regions of at least one home screen other than the first home screen (e.g., the second home screen), to a display screen displaying the second home screen and some regions of at least one home screen other than the second home screen, and display the changed display screen. The fourth user manipulation recited herein may be a user manipulation of selecting a 'direction button' of the remote controller or selecting some regions of the second home screen positioned at the left or right of the display screen.

When the display apparatus 100 is turned on, the controller 130 may control the display 110 to display an intro image displaying the plurality of home screens in sequence, and to display a display screen that is generated after the intro image has been displayed.

Hereinafter, an operation of a display apparatus 100 according to an exemplary embodiment will be explained in detail with reference to FIGS. 3 to 9.

FIGS. 3 to 7 are views illustrating a plurality of display screens which are generated according to an exemplary embodiment. Hereinafter, for the convenience of explanation, it is assumed that a plurality of home screens according to an exemplary embodiment includes five home screens, and that a second home screen is positioned on the left of a first home screen, a third home screen is positioned on the left of the second home screen, a fourth home screen is positioned on the right of the first home screen, and a fifth home screen is positioned on the right of the fourth home screen and the left of the third home screen. Also, it is assumed that the first home screen is a home screen for a broadcasting service, the second home screen is a home screen for an application providing service, the third home screen is a home screen for an integrated communication service, the fourth home screen is a home screen for a video on demand (VOD) service, and the fifth home screen is a home screen for a content providing service.

Figure 3:
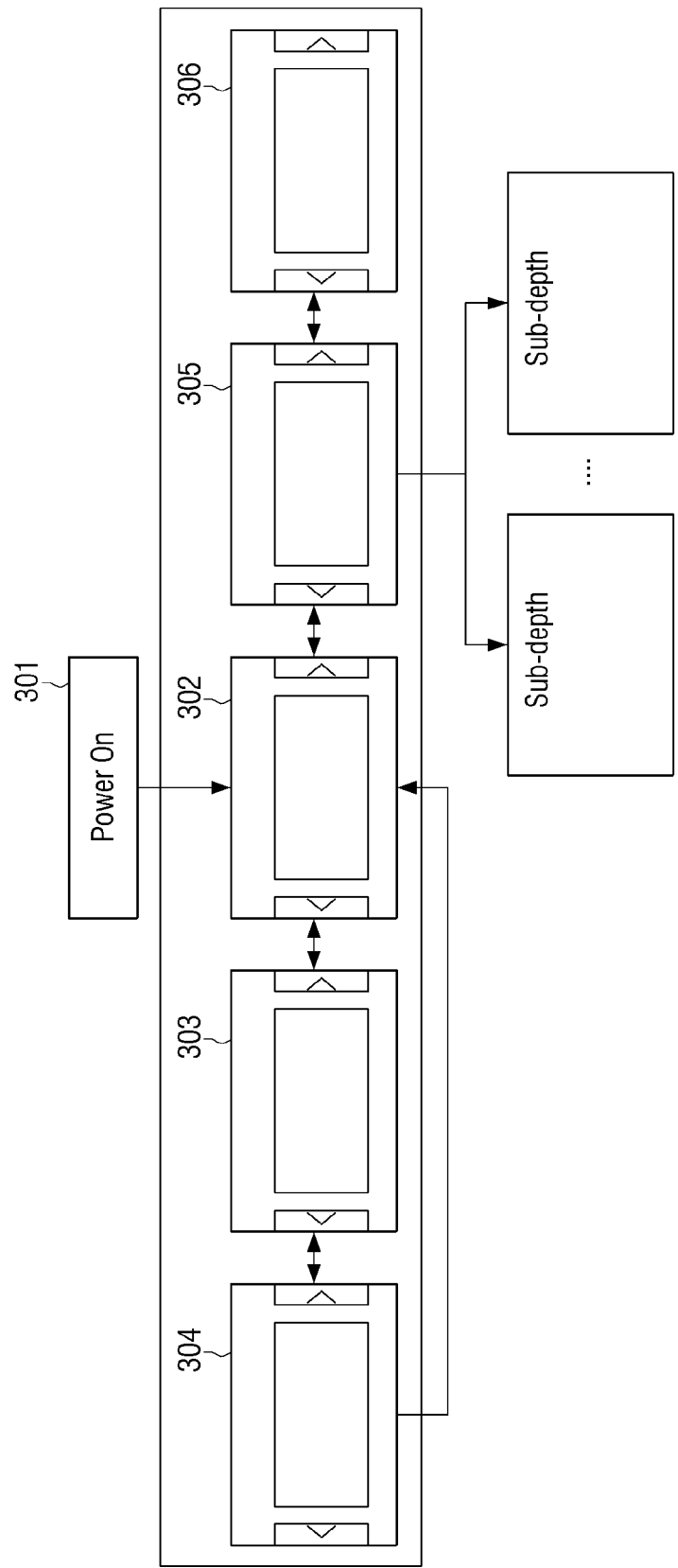
FIGS. 3 to 10 are views illustrating display screens according to an exemplary embodiment.

As illustrated in FIG. 3, a second display screen 303 is positioned on the left of a first display screen 302, a third display screen 304 is positioned on the left of the second display screen 303, a fourth display screen 305 is positioned on the right of the first display screen 302, and a fifth display screen 306 is positioned on the right of the fourth home screen 305.

Figure 4:
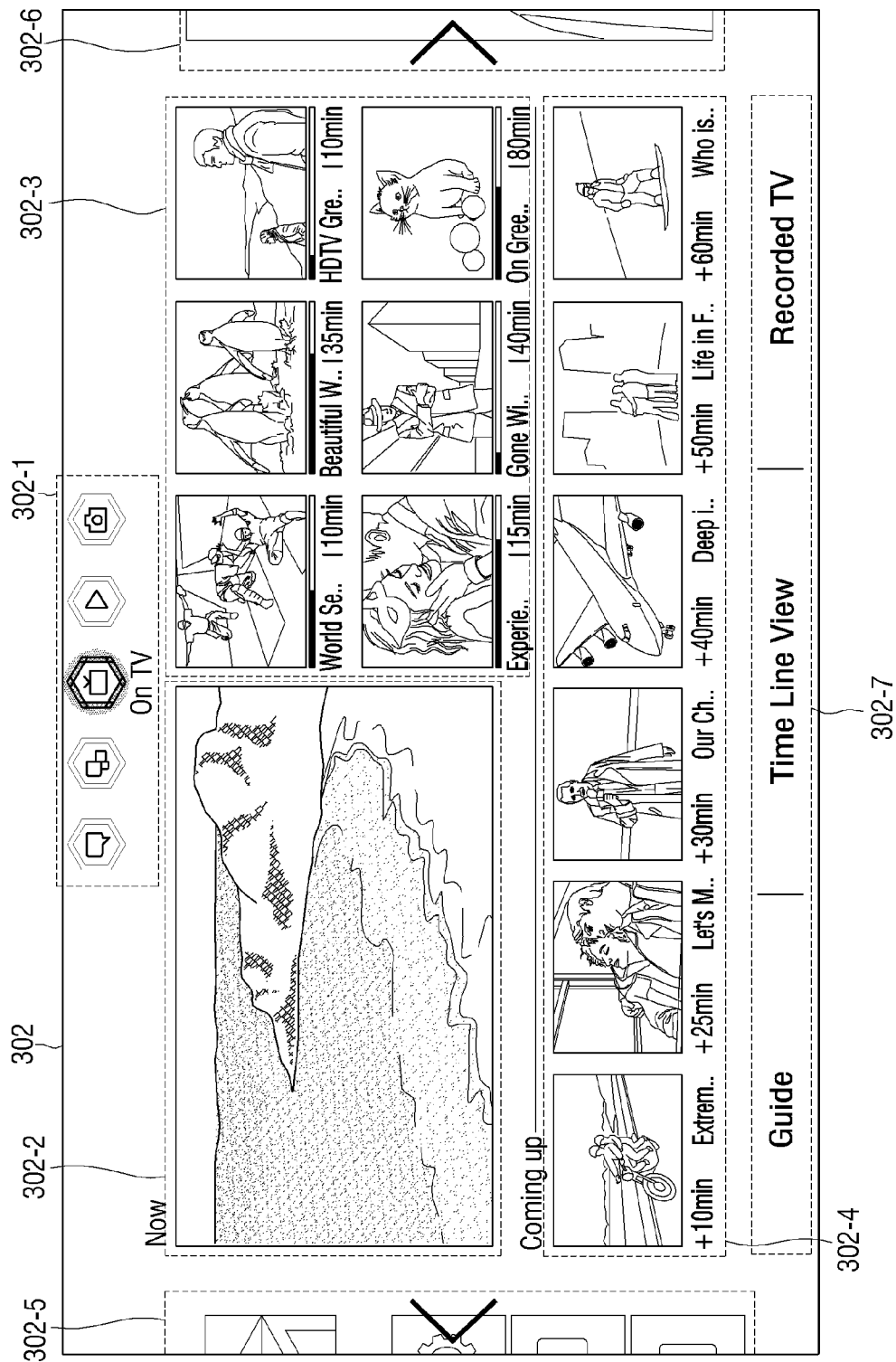

Referring to FIGS. 3 to 7, a first display screen 302, as illustrated in FIG. 4, includes the first home screen including regions 302-1, 302-3, 302-3, 302-4, and 302-7, region 302-5 of the second home screen, and region 302-6 of the fourth home screen. The first home screen includes a region 302-1 to display a category "On TV" of the first home screen (i.e., a home screen for a broadcasting service), a region 302-2 to display a broadcasting service of a channel which is selected shortly before the display apparatus 100 is turned off, a region 302-3 to display broadcasting services of the other channels, a region 302-4 to display next broadcasting services, and a region 302-7 to display sub-depth items "Guide, Time Line View, and Recorded TV" of the first home screen.

Figure 5:
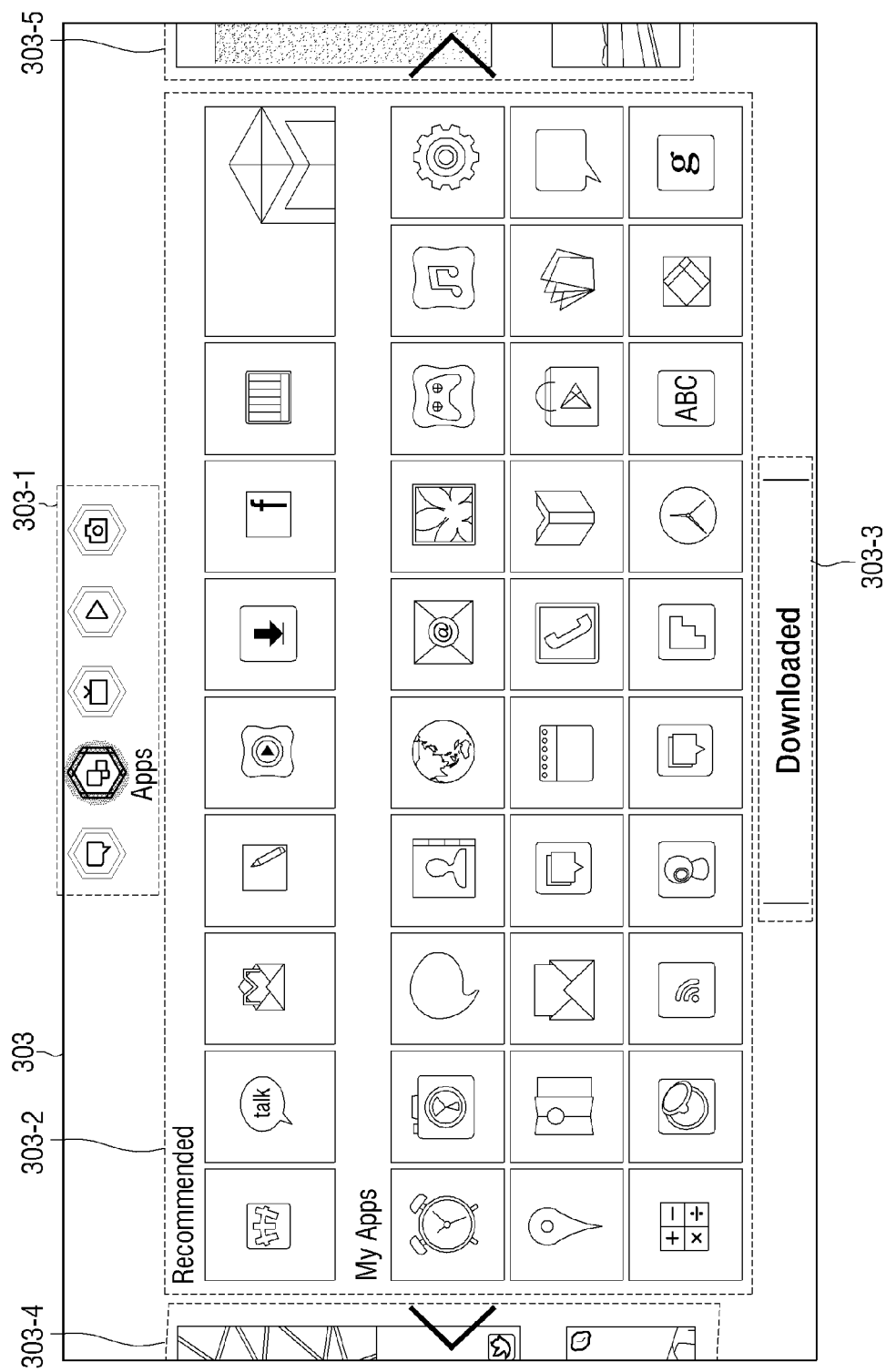

As illustrated in FIG. 5, a second display screen 303 includes the second home screen including regions 303-1, 303-2, and 303-3, region 303-4 of the third home screen, and region 303-5 of the first home screen. The second home screen includes a region 303-1 to display a category "Apps" of the second home screen (i.e., a home screen for an application providing service), a region 303-2 to display recommended applications and installed applications, and a region 303-3 to display sub-depth items "Downloaded" of the second home screen.

Figure 6:
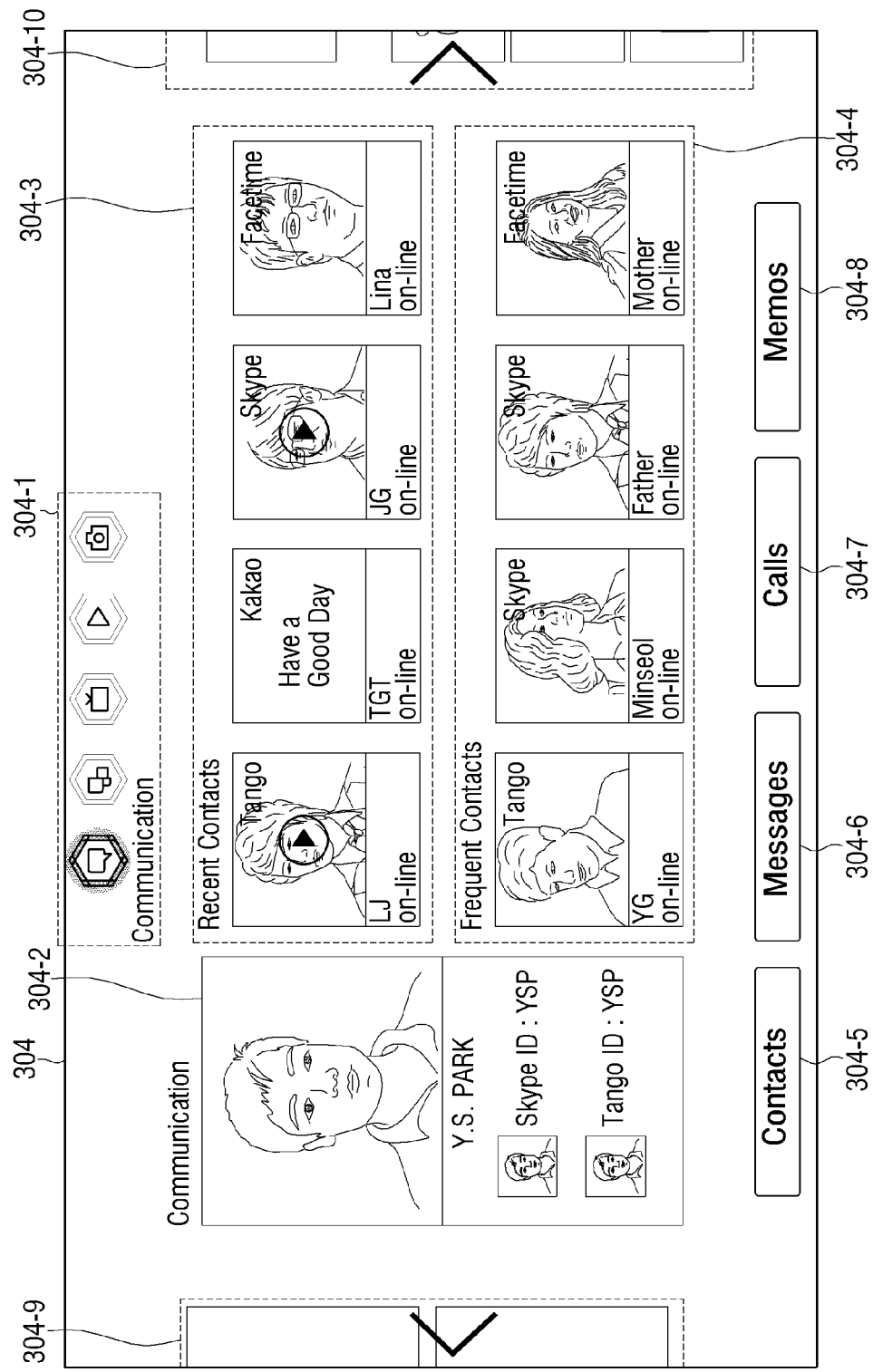

As illustrated in FIG. 6, a third display screen 304 includes the third home screen including regions 304-1 to 304-8, region 304-9 of the fifth home screen, and region 304-10 of the second home screen. The third home screen including regions 304-1 to 304-8 may include a region 304-1 to display a category "Communication" of the third home screen (i.e., an integrated communication service home screen), a region 304-2 to display user profile information of the user of the display apparatus 100, a region 304-3 to display a list of persons that have been recently contacted through the communication service, a region 304-4 to display a list of persons that are frequently contacted through the communication service, a region 304-5 to display an integrated list of friends, a region 304-6 to display an integrated list of messages, a region 304-7 to display an integrated list of calls, and a region 304-8 to display a memo pad.

The list of persons displayed in the regions 304-3 and 304-4 may include a variety of metadata information, such as profile information (e.g., a name, photo, phone number, email, etc.), a contact method (e.g., a call service: a voice call service, a video call service (Skype® service, Tango® service), etc., a messaging service: a text messaging service, Kakao Talk®, etc., a social network service: Facebook®, Twitter®, etc.), a number of times that contact is made, a contact time, whether a user is online or offline, etc.

When the region 304-5 to display the integrated list of friends is selected, a list of friends that integrates a list of friends registered at various call services, a list of friends registered at various messaging services, and a list of friends registered at various social network services may be displayed. In this case, each list of friends may display information such as profile information, a kind of a communication service in use, whether a friend is online or offline, a number of times that contact is made, a contact time, etc.

When the region 304-6 to display the integrated list of messages is selected, a list of messages that integrates message sending/receiving history using various messaging services may be displayed. In this case, each list of messages may display information such as profile information, a message sending/receiving method (e.g., a text messaging service, Kakao Talk® service, and a message sending/receiving method using a social network service such as Facebook® and Twitter®), a number of times that contact is made, a contact time, etc.

When the region 304-7 to display the integrated list of calls is selected, a list of calls that integrates call receiving/sending history using various communication services may be displayed. In this case, each list of calls may display information such as profile information, a call receiving/sending method (e.g., a call receiving/sending method using a voice call service or a video call service such as Skype® and Tango®), a number of times that contact is made, a contact time, etc.

On the other hand, when a user manipulation to perform a video call service is received through the integrated communication service home screen, the controller 130 may make a video call to at least one counterpart apparatus. Also, when the video call is made, the controller 130 may control the display 110 to display a video call screen which includes a screen displaying the user of the display apparatus 100 and a screen displaying a user of the at least one counterpart apparatus. This will be explained in detail below with reference to FIG. 10.

Figure 7:
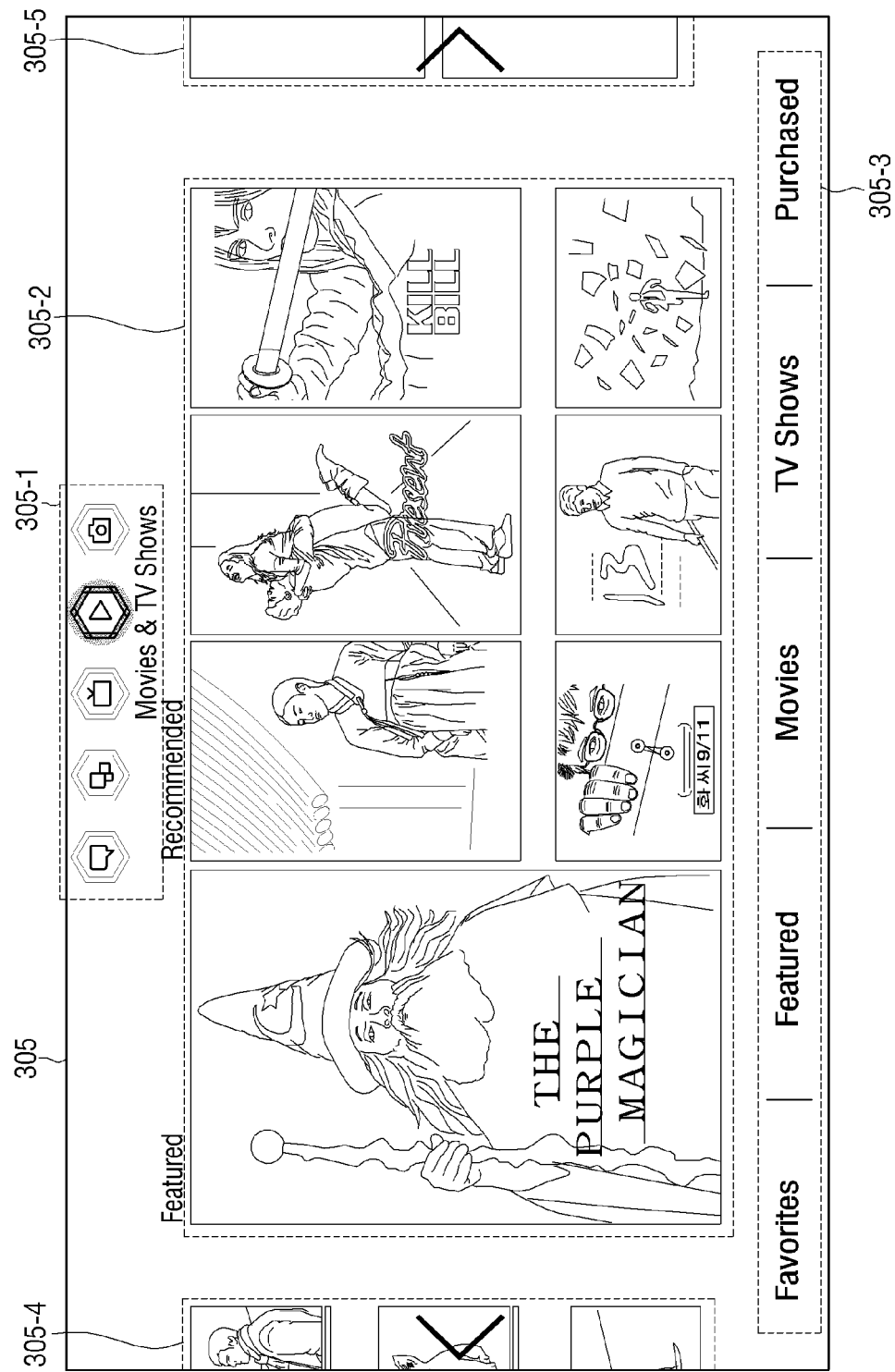

As illustrated in FIG. 7, a fourth display screen 305 includes the fourth home screen including regions 305-1, 305-2, and 305-3, region 305-4 of the first home screen, and region 305-5 of the fifth home screen. The fourth home screen includes a region 305-1 to display a category "Movies & TV Shows" of the fourth home screen (i.e., a home screen for a video on demand (VOD) service), a region 305-2 to display a VOD service, and a region 305-3 to display sub-depth items "Favorites, Featured, Movies, TV Shows, and Purchased" of the fourth home screen Q.

As illustrated in FIG. 3, when the display apparatus 100 is turned on (301), the controller 130 may generate a plurality of home screens that the display apparatus 100 can provide, and may generate the display screens 302, 303, 304, 305, and 306 using the plurality of home screens. Specifically, the controller 130 may generate the plurality of display screens 302, 303, 304, 305, and 306 by positioning one of the plurality of home screens on a center of the display screen, and positioning some regions of other home screens on the left and the right of the display screen.

When the display apparatus 100 is turned on, the controller 130 may control the display 110 to display the display screen including the default home screen 302 from among the plurality of display screens. The default home screen may be a screen of a broadcasting service that is performed shortly before the display apparatus 100 is turned off, as shown in FIG. 4.

When a predetermined fourth user manipulation is input through the inputter 120 while a screen as shown in any one of FIGS. 4 to 7 is displayed, the controller 130 may switch between the plurality of display screens. For example, when the first display screen is displayed as shown in FIG. 4, and when the user selects a 'left button' of a remote controller, selects the region 302-5 to display some regions of the second home screen of the display screen, or selects "Apps" of the region 302-1, the second display screen of FIG. 5 may be displayed. Also, when the third display screen is displayed as shown in FIG. 6, and when the user selects a 'default home button' of the remote controller or selects "ON TV" of the region 304-1, the first display screen of FIG. 4 may be displayed.

The controller 130 may control the display 110 to change the display screen displaying the first home screen and some regions of at least one home screen other than the first home screen to the display screen displaying the second home screen and some regions of a home screen other than the second home screen, and display the changed display screen. The fourth user manipulation recited herein may be a user manipulation of selecting a 'direction button' of the remote controller or selecting some regions of the second home screen which are positioned on the left or right of the display screen.

Although five home screens are provided in FIGS. 3 to 7, the number of home screens is not limited. Also, services that the display apparatus 100 can provide are not limited to the above-mentioned services, and may vary according to an exemplary embodiment.

Figure 8:
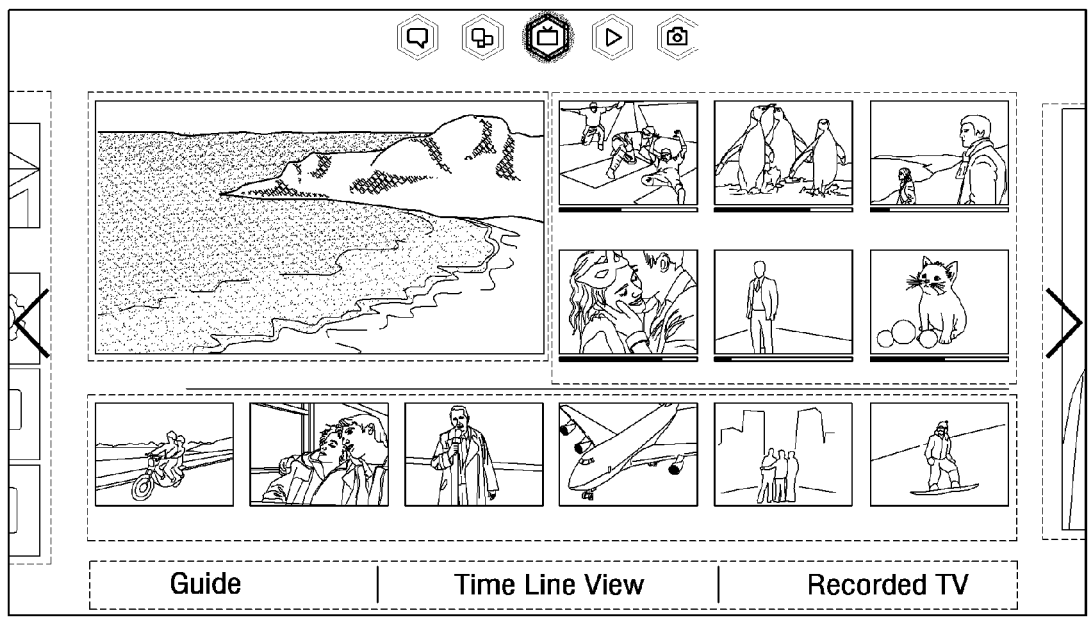
Figure 8:
Figure 8:
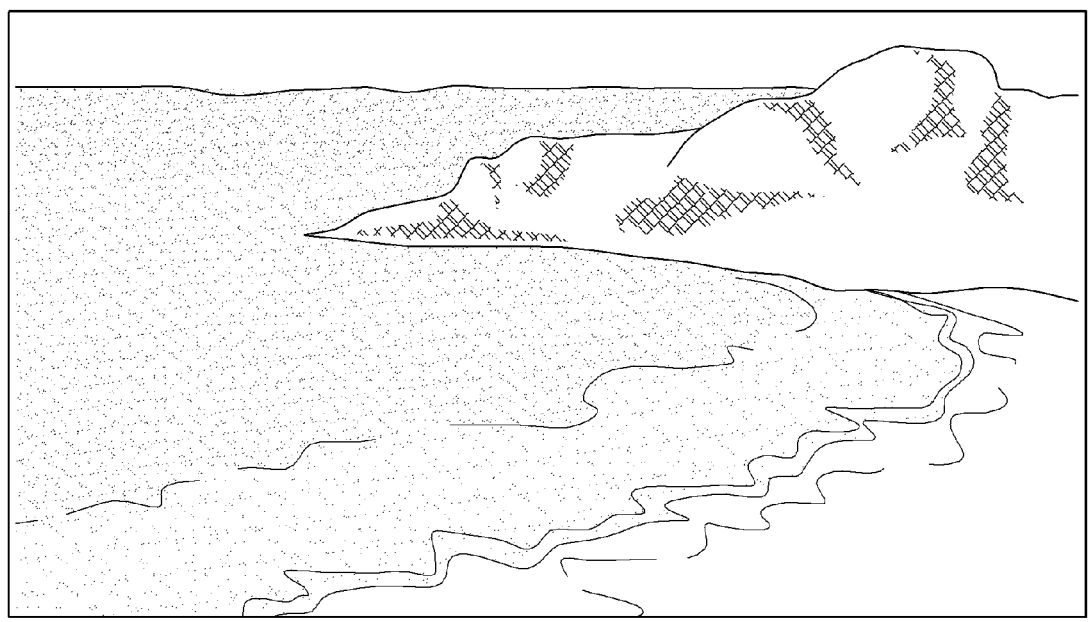
Figure 9:
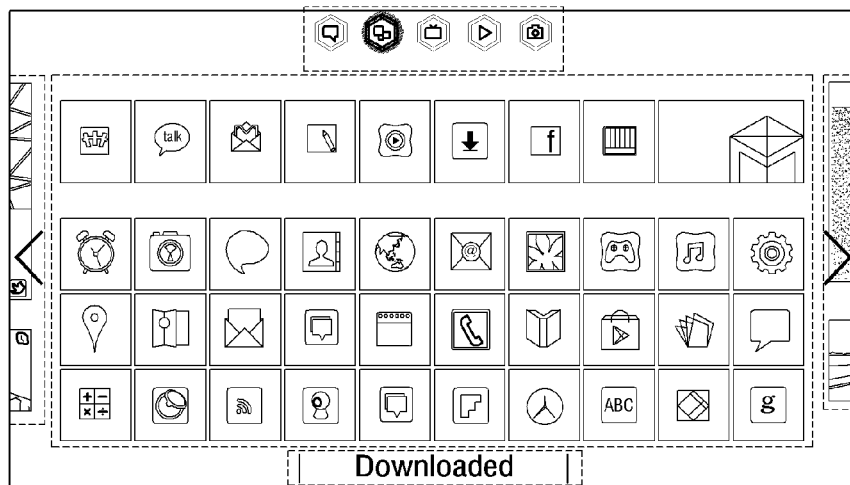
Figure 9:
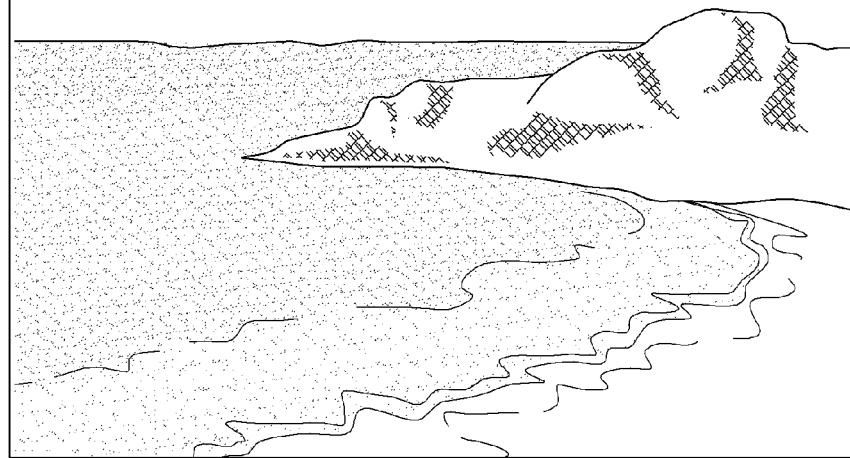
Figure 9:
Figure 10:
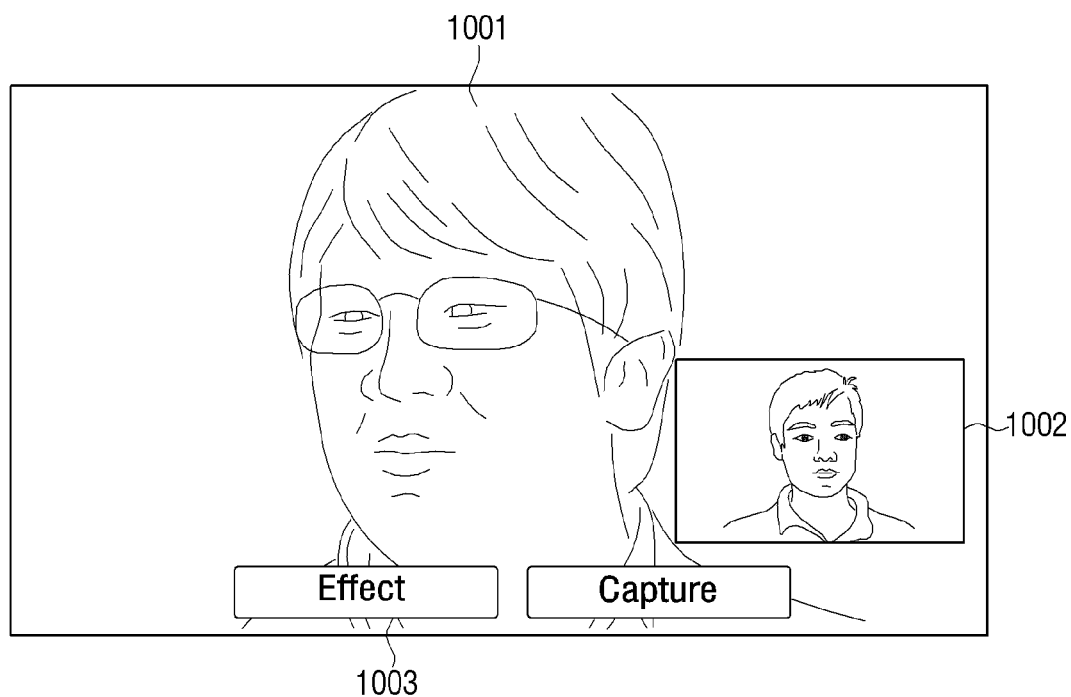

FIGS. 8 to 10 are views to illustrate an operation of a display apparatus 100 according to an exemplary embodiment.

Referring to FIG. 8, in a state in which the first display screen 302, including the first home screen including regions 302-1, 302-2, 302-3, 302-4, and 302-7, region 302-5 of the second home screen, and region 302-6 of the fourth home screen, is displayed as shown in view (a) of FIG. 8, when a predetermined time elapses after the display apparatus 100 has been turned on, a display screen displaying the first home screen including regions 302-1, 302-2, 302-3, 302-4, and 302-7 as a full screen may be displayed. Alternatively, a display screen displaying the region 302-2, which displays a broadcasting service selected shortly before the display apparatus 100 is turned off, as a full screen may be displayed, as shown in view (b) of FIG. 8.

However, this is merely an example. When a predetermined first user manipulation is input through the display screen shown in view (a) of FIG. 8, a display screen displaying the first home screen as a full screen may be displayed. The predetermined first user manipulation may be a user manipulation of touching the first home screen positioned on the center of the display screen or selecting a 'full screen display button' of the remote controller.

Alternatively, the controller 130 may control the display 110 to display the display screen displaying the default home screen as a full screen when a predetermined time elapses after the display apparatus 100 has been turned on. Accordingly, the default home screen may be displayed as the full screen regardless of the home screen which is positioned on the center of the current display screen.

Referring to FIG. 9, in a state in which a display screen displaying a full screen is displayed as shown in view (b) of FIG. 9, when a predetermined third user manipulation is input through the inputter 120, a display screen including a plurality of home screens may be displayed as shown in views (a) and (c) of FIG. 9. For example, in a state in which a display screen displaying the first home screen as a full screen is displayed, when the 'left button' is selected through the remote controller, a display screen displaying the second home screen, some regions of the third home screen, and some region of the first home screen may be displayed.

Referring to FIG. 10, the display 110 may display a video call screen including a screen 1002 displaying the user of the display apparatus 100 and a screen 1001 displaying the user of at least one counterpart apparatus. The video call screen recited herein may include a region 1003 to display a list of image processing operations on the screen of the user of the display apparatus 100.

When the region 1003 to display the list of image processing operations is selected, a list of image processing operations including at least one of processing a background screen of the screen of the user of the display apparatus 100, adding a character effect to the screen of the user of the display apparatus 100, and zooming in/out the screen of the user of the display apparatus 100 may be displayed.

According to the above-described various exemplary embodiments, by providing the integrated communication service home screen, the display apparatus 100 allows the user to easily use various communication services.

Also, according to various exemplary embodiments, when the display apparatus 100 is turned on, a display screen including a default home screen and some regions of a home screen other than the default home screen from among a plurality of home screens is displayed. As such, the user can easily recognize various services of the display apparatus 100 at the same time when the display apparatus 100 is turned on.

Also, according to various exemplary embodiments, when the display apparatus 100 is providing a service, the user can access other services with a simple manipulation.

Figure 11:
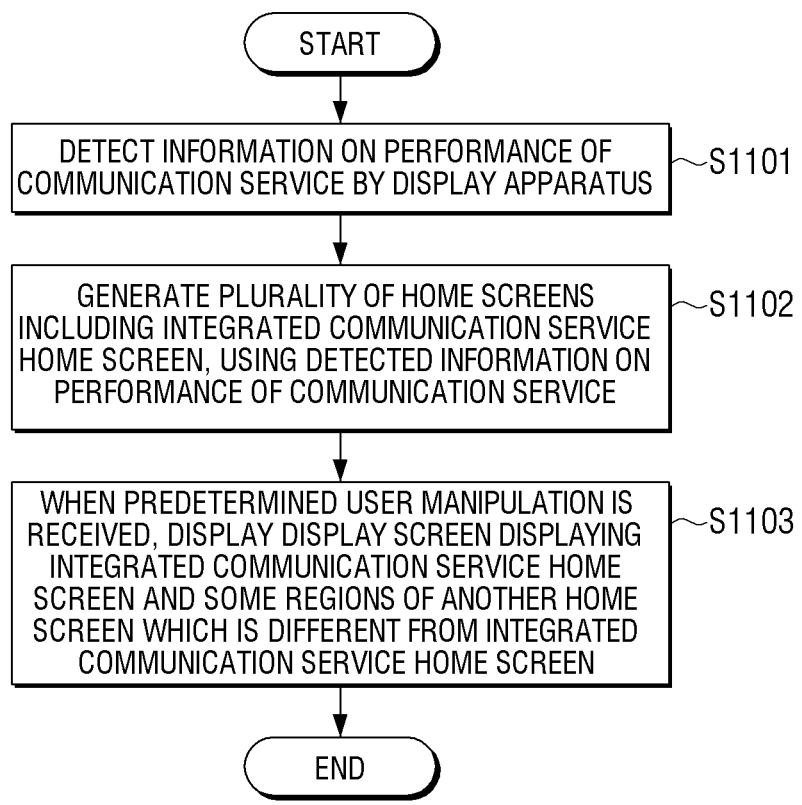
FIG. 11 is a flowchart illustrating a control method of a display apparatus according to an exemplary embodiment.

FIG. 11 is a flowchart illustrating a control method of a display apparatus according to an exemplary embodiment. Referring to FIG. 11, performance information of a communication service by the display apparatus is detected (S1101).

The communication service may include at least one of a phone call service which is performed through the display apparatus, a messaging service which is performed through the display apparatus, and a social network service which is performed through the display apparatus.

Also, a plurality of home screens including an integrated communication service home screen are generated using the detected performance information of the communication service (S1102).

The integrated communication service home screen may include a first region to display a list of persons that have been recently contacted through the communication service, and a second region to display a list of persons that are frequently contacted through the communication service.

Also, the integrated communication service home screen may further include a third region to display an integrated list of friends, a fourth area to display an integrated list of messages, and a fifth region to display an integrated list of calls.

Also, when a predetermined user manipulation is received, a display screen displaying the integrated communication service home screen and some regions of a home screen other than the integrated communication service home screen is displayed (S1103).

In the displaying operation (S1103), a display screen displaying the integrated communication service home screen at a center of the display screen, and displaying some regions of home screens other than the integrated communication service home screen at a left side and a right side of the display screen may be displayed.

The control method of the display apparatus according to an exemplary embodiment may further include: making a video call to at least one counterpart apparatus according to a user manipulation on the integrated communication service home screen, and, when the video call is made, displaying a video call screen including a screen displaying a user of the display apparatus and a screen displaying a user of the at least one counterpart apparatus. The video call screen may include a sixth region to display a list of image processing operations for the screen displaying the user of the display apparatus. The list of image processing operations for the screen displaying the user of the display apparatus may include at least one of operations of: processing a background screen of the screen displaying the user of the display apparatus, of adding a character effect to the screen displaying the user of the display apparatus, and of zooming in/out the screen displaying the user of the display apparatus.

The control method of the display apparatus according to an exemplary embodiment may further include, when a predetermined time elapses since the display screen has been displayed, displaying a display screen displaying only the integrated communication service home screen.

The control method of the display apparatus according to an exemplary embodiment may further include: receiving a user manipulation to select the home screen other than the integrated communication service home screen, and displaying a display screen which is generated based on the selected home screen.

The control method of the display apparatus according to the above-described various exemplary embodiments may be implemented as a program code, stored in various non-transitory computer readable media, and provided to each apparatus.

The non-transitory computer readable medium refers to a medium that stores data semi-permanently such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

According to various exemplary embodiments, by providing the integrated communication service home screen, the display apparatus allows the user to easily use various communication services.

Further, according to various exemplary embodiments, when the display apparatus is turned on, a display screen including a default home screen and some regions of a home screen other than the default home screen from among a plurality of home screens is displayed. As such, the user can easily recognize various services of the display apparatus at the same time when the display apparatus is turned on.

Further still, according to various exemplary embodiments, when the display apparatus is providing a service, the user can access other services with a simple manipulation.

The foregoing exemplary embodiments and advantages are merely exemplary and are not to be construed as limiting the inventive concept as defined by the appended claims. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A control method of a display apparatus, the control method comprising:
   communicating with a counterpart apparatus using one of a plurality of communication services;
   detecting use history and metadata of the plurality of communication services;
   generating an integrated communication service home screen including the metadata based on the detected use history of the plurality of communication services; and
   displaying the integrated communication service home screen,
   wherein the integrated communication service home screen provides integrated history which integrates use history of the plurality of communication services.

2. The control method as claimed in claim 1, wherein the plurality of communication services comprise at least one of a call service, a messaging service, and a social network service.

3. The control method as claimed in claim 1, wherein the integrated communication service home screen comprises a first region to display a list of persons that have been recently contacted through at least one of the plurality of communication services, and a second region to display a list of persons that are frequently contacted through at least one of the plurality of communication services.

4. The control method as claimed in claim 3, wherein the integrated communication service home screen further comprises a third region to display an integrated list of friends, a fourth region to display an integrated list of messages, and a fifth region to display an integrated list of calls.

5. The control method as claimed in claim 1, further comprising:
   making a video call to the counterpart apparatus in response to a user manipulation on the integrated communication service home screen; and
   in response to the video call being made, displaying a video call screen comprising a screen displaying a user of the display apparatus and a screen displaying a user of the counterpart apparatus, wherein the video call screen comprises a sixth region to display a list of image processing operations for the screen displaying the user of the display apparatus.

6. The control method as claimed in claim 5, wherein the list of image processing operations for the screen displaying the user of the display apparatus comprises at least one of operations of processing a background screen of the screen displaying the user of the display apparatus, adding a character effect to the screen displaying the user of the display apparatus, and zooming in/out the screen displaying the user of the display apparatus.

7. The control method as claimed in claim 1, wherein the displaying comprises displaying a display screen on which the integrated communication service home screen is positioned at a center of the display screen, and regions of home screens other than the integrated communication service home screen are positioned at a left side and a right side of the display screen.

8. The control method as claimed in claim 1, further comprising, in response to a predetermined time elapsing after the integrated communication service home screen has been displayed, displaying a display screen displaying only the integrated communication service home screen.

9. The control method as claimed in claim 1, further comprising:
receiving a user manipulation to select a home screen other than the integrated communication service home screen; and
displaying a display screen which is generated based on the selected home screen.

10. A display apparatus comprising:
a display configured to display a screen;
a communicator configured to communicate with a counterpart apparatus using one of a plurality of communication services; and
a controller configured to detect use history and metadata of the plurality of communication services, and to generate an integrated communication service home screen including the metadata based on the detected use history of the plurality of communication services, and to control the display to display the integrated communication service home screen,
wherein the integrated communication service home screen provides integrated history which integrates use history of the plurality of communication services.

11. The display apparatus as claimed in claim 10, wherein the plurality of communication services comprise at least one of a call service, a messaging service, and a social network service.

12. The display apparatus as claimed in claim 10, wherein the integrated communication service home screen comprises a first region to display a list of persons that have been recently contacted though at least one of the plurality of communication services, and a second region to display a list of persons that are frequently contacted though at least one of the plurality of communication services.

13. The display apparatus as claimed in claim 12, wherein the integrated communication service home screen further comprises a third region to display an integrated list of friends, a fourth region to display an integrated list of messages, and a fifth region to display an integrated list of calls.

14. The display apparatus as claimed in claim 10, wherein the controller is further configured to make a video call to the counterpart apparatus in response to a user manipulation on the integrated communication service home screen,
wherein, in response to the video call being made, the display is further configured to display a video call screen comprising a screen displaying a user of the display apparatus and a screen displaying a user of the counterpart apparatus, and
wherein the video call screen comprises a sixth region to display a list of image processing operations for the screen displaying the user of the display apparatus.

15. The display apparatus as claimed in claim 14, wherein the list of image processing operations of the screen on the user of the display apparatus comprises at least one of operations of processing a background screen of the screen on the user of the display apparatus, adding a character effect to the screen on the user of the display apparatus, and zooming in/out the screen on the user of the display apparatus.

16. The display apparatus as claimed in claim 10, wherein the controller is further configured to control the display to display a display screen on which the integrated communication service home screen is positioned at a center of the display screen, and regions of home screens other than the integrated communication service home screen are positioned at a left side and a right side of the display screen.

17. The display apparatus as claimed in claim 10, wherein, in response to a predetermined time elapsing after the integrated communication service home screen has been displayed, the controller is further configured to control the display to display a display screen displaying only the integrated communication service home screen.

18. The display apparatus as claimed in claim 10, wherein the inputter is configured to receive a user manipulation to select a home screen other than the integrated communication service home screen, and the controller is further configured to control the display to display a display screen which is generated based on the selected home screen.

19. A non-transitory computer-readable recording medium having recorded thereon a program which, when executed by a computer, performs a control method of a display apparatus, the control method comprising:
communicating with a counterpart apparatus using one of a plurality of communication services;
detecting use history and metadata of the plurality of communication services;
generating an integrated communication service home screen including the metadata based on the detected use history of the plurality of communication services; and
displaying the integrated communication service home screen,
wherein the integrated communication service home screen provides integrated history which integrates use history of the plurality of communication services.

20. A display apparatus comprising:
a communicator configured to communicate with a counterpart apparatus using one of a plurality of communication services; and
a controller configured to detect use history and metadata of the plurality of communication services, and to generate an integrated communication service home screen including the metadata based on the detected use history of the plurality of communication services, and to control a display to display the integrated communication service home screen,
wherein the integrated communication service home screen provides integrated history which integrates use history of the plurality of communication services.

* * * * *